United States Patent
Noenen

(10) Patent No.: US 7,671,581 B2
(45) Date of Patent: Mar. 2, 2010

(54) MAGNETIC PULSE GENERATOR FOR MEASURING WHEEL REVOLUTIONS ON BICYCLES

(75) Inventor: Hans-Joachim Noenen, Hassloch (DE)

(73) Assignee: Cycle Parts GmbH, Rohrbach (DE)

( * ) Notice: Subject to any disclaimer, the term of this patent is extended or adjusted under 35 U.S.C. 154(b) by 330 days.

(21) Appl. No.: 11/661,187

(22) PCT Filed: Apr. 29, 2005

(86) PCT No.: PCT/DE2005/000794
§ 371 (c)(1),
(2), (4) Date: May 25, 2007

(87) PCT Pub. No.: WO2006/021168
PCT Pub. Date: Mar. 2, 2006

(65) Prior Publication Data
US 2008/0061767 A1     Mar. 13, 2008

(30) Foreign Application Priority Data
Aug. 27, 2004   (DE) .................. 10 2004 041 832

(51) Int. Cl.
*G01P 3/44* (2006.01)
(52) U.S. Cl. .................................... 324/174
(58) Field of Classification Search ............ 324/207.22, 324/160, 166, 167, 174, 178; 73/514.39; 340/432
See application file for complete search history.

(56) References Cited

U.S. PATENT DOCUMENTS

| | | | |
|---|---|---|---|
| 4,633,216 A * | 12/1986 | Tsuyama | 340/432 |
| 4,695,099 A   | 9/1987  | Klein et al. | |
| 5,775,653 A * | 7/1998  | Horney et al. | 248/230.8 |
| 6,059,241 A * | 5/2000  | Martone | 248/230.1 |
| 6,158,640 A * | 12/2000 | Karp et al. | 224/411 |
| 6,188,215 B1  | 2/2001  | Muraoka et al. | |

(Continued)

FOREIGN PATENT DOCUMENTS

DE      101 40 349 A1      3/2002

(Continued)

OTHER PUBLICATIONS

SIGMA Sport, XP002341977, "Bike Computer BC 400-Bedienungsanleitung" 'Online! 1997, Neustradt, Germany.

*Primary Examiner*—Kenneth J Whittington
(74) *Attorney, Agent, or Firm*—Birch, Stewart, Kolasch & Birch, LLP

(57) ABSTRACT

A magnetic pulse generator for measuring wheel revolutions of bicycles includes a magnet and an attachment device for attaching the magnet to a component (or spoke) of a wheel. Damage to the component to which attachment is to take place is to be prevented, and the installation expenditure during attachment is to be reduced. Furthermore, the magnetic pulse generator known from practical application is to be improved in that it is applicable to components of various geometric shapes, in particular to round components of various diameters and to flat components spokes of various widths. This object is met with an attachment device that includes a housing that encompasses the component, and that is formed as a longitudinally slit tubular piece. Ends of the housing forming the longitudinal slit can be connected to each other in a positive-locking and/or non-positive manner, and a spacing (A) therebetween is variable.

18 Claims, 3 Drawing Sheets

U.S. PATENT DOCUMENTS

Figure 1:
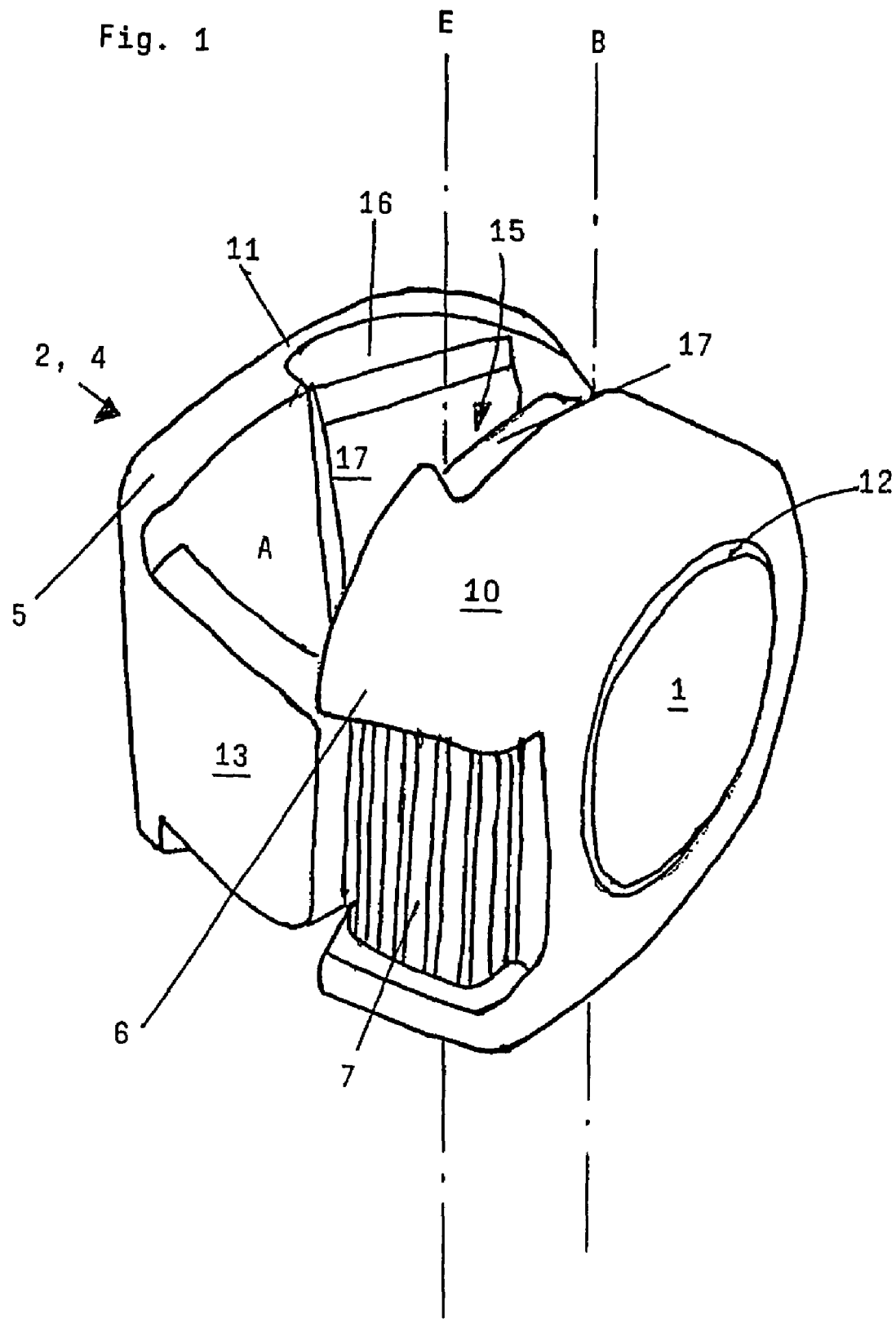

| | | | |
|---|---|---|---|
| 6,192,300 B1 * | 2/2001 | Watarai et al. | 701/1 |
| 6,598,894 B1 * | 7/2003 | Fujii et al. | 280/288.4 |
| RE39,781 E * | 8/2007 | Muraoka et al. | 324/174 |
| 2003/0177678 A1* | 9/2003 | Sloot | 40/587 |

FOREIGN PATENT DOCUMENTS

| | | | |
|---|---|---|---|
| FR | 2430346 | * | 3/1980 |
| JP | 2-136384 A | | 5/1990 |
| JP | 2001-130466 A | | 5/2001 |
| JP | 2002-87359 A | | 3/2002 |
| WO | WO-95/23726 A1 | | 9/1995 |
| WO | WO 95/23726 A1 | | 9/1995 |

* cited by examiner

MAGNETIC PULSE GENERATOR FOR MEASURING WHEEL REVOLUTIONS ON BICYCLES

The present invention relates to a magnetic pulse generator, in particular for measuring wheel revolutions of bicycles and the like, comprising a magnet and an attachment device for attaching the magnet to a movable component, in particular to a spoke of a wheel.

Magnetic pulse generators interact with sensors. The sensors receive the pulses of the magnet of the pulse generator. These pulses from the transmitter, which pulses are received by the sensor, are processed by a computer that interacts with the sensor. The sensor and the computer can be interconnected by cable, or there can be wireless radio transmission from the sensor to the computer.

The combination of computer, sensor and pulse generator can, for example in bicycles, be applied to determine speed, distance or pedalling frequency. If the speed and distance are to be determined by means of a bicycle computer, the magnetic pulse generator is required to trigger a pulse in the sensor at each wheel revolution. This pulse is conveyed by way of the sensor to the bicycle computer. In the bicycle computer the wheel circumference is precisely programmed in. In the computer the incoming pulse is multiplied by the wheel circumference that has been programmed into said computer, by way of suitable software, and added up so that the cycled distance can be determined. By way of the internal clock of the bicycle computer, pulses (distance covered) per unit of time can be calculated, from which the speed can be derived.

From practical application, magnetic pulse generators are known which for the purpose of being attached to the spoke of a wheel comprise a particular shape of the attachment device that comprises the magnet. In concrete terms, a dome in the shape of a hollow cylinder is milled out of the attachment device. The dome comprises a slit into which a spoke of the wheel is placed across the longitudinal axis of the magnet. In other words, the spoke transversely extends into the interior of the hollow-cylindrical dome. In order to affix the attachment device to the spoke, a screw is driven into the interior of the dome.

The magnetic pulse generator known from practical application is associated with a number of disadvantages. Firstly, when the screw is driven into the hollow-cylindrical dome, the spoke of the wheel can be damaged. Secondly, it is always necessary to use a tool in order to achieve attachment, which increases the installation effort. Finally, the slit in the hollow-cylindrical dome only fits spokes of a particular geometry. With the multitude of spoke cross sections, such as round spokes with diameters of between 1.8 and 3.4 mm, it is difficult to find the matching pulse generator and/or to attach it to the spoke in a lengthy process of handcrafting. Apart from round spokes there are also flat spokes with widths of up to 5.4 mm. With such flat spokes it is not possible to use the magnetic pulse generators known from practical applications.

From DE 101 40 349 A1 a magnet affixation structure is known, wherein the magnet is accommodated in the head part of a screw, and the screw is screwed into the internal screw thread of a counterpiece while jamming the spoke. The counterpiece comprises a recess for accommodating the spoke. This design is associated with disadvantages in that screwing involves a time-consuming attachment process, in that the screw-head part comprising the magnet causes the wheel to be out of balance when the bicycle attains higher speeds, and in that particular internal shapes of the counterpiece as well as rubber supports for round or flat spokes are necessary.

A further attachment device for a magnetic pulse generator is disclosed in U.S. Pat. No. 6,188,215 B1. In that patent specification a housing encompasses a spoke, wherein the internal design of the housing that accommodates the magnet specially matches the geometry and dimension of the spoke. Consequently said magnet attachment is associated with a disadvantage in that its field of application is severely limited.

Starting with the known state of the art, it is the object of the intention, with the use of a magnetic pulse generator of the type mentioned, to prevent damage to the component to which attachment is to take place;

reduce the installation effort during attachment; and make possible its application with components of various geometric shapes, in particular with round spokes of various diameters, as well as with flat spokes of various width dimensions.

The above object is met by the characteristics of claim 1. Accordingly, a magnetic pulse generator of the type under discussion is designed and improved such that the attachment device comprises a housing that encompasses the component, and such that the housing is designed in the manner of a longitudinally slit tubular piece, wherein the ends that form the longitudinal slit can be connected to each other in a positive-locking and/or non-positive manner, with their spacing from each other being variable.

First of all it has been found that a magnetic pulse generator of the type under discussion damages the component to which it is to be attached, can only be used in conjunction with certain components, and can only be installed with the use of a tool.

According to the invention it has been found that damage to the component can be avoided if attachment is not with the use of a screw, but instead if a housing encompasses the component. A housing provides an advantage in that it can comprise interior lining that protects the component. Furthermore, it has been found that the disadvantage of affixation to certain component geometries can be overcome, and the need for the use of a tool during installation is obviated if the housing is designed in the manner of a longitudinally slit tubular piece, wherein the ends that form the longitudinal slit can be connected to each other, and wherein the space between the ends that form the longitudinal slit is variable. In this way the pulse generator according to the invention can be applied to components with cross sections of different dimensions. Because of the housing that is open on both sides in transverse direction, and that can additionally be opened and closed in longitudinal direction, and because of the longitudinal opening whose space can be varied, the pulse generator according to the invention can conveniently be placed onto the component, in particular a spoke, whereupon it can be attached to the component by connecting the two ends that form the longitudinal slit or the longitudinal opening.

A particularly advantageous variant of connecting to each other the two ends that form the longitudinal slit consists of using connection means that form a snap-in connection. It is particularly advantageous if the connection means comprise several snap-in teeth so that the force required for attachment can be set depending on the geometry of the component. The tooth arrangement of the snap-in connection snaps in even more firmly if a pressing force is applied. Instead of using connection means that form a snap-in connection, other connection means can be used, for example contact means comprising corresponding recesses, bayonet-like connection means or the like.

In order to ensure secure attachment as well as making it more difficult for others to remove the magnetic pulse generator, the snap-in connection means could be designed such that once locked into place they can only be opened with the use of a tool, in particular with a screwdriver. In principle, detachable attachment of the pulse generator on the component is advantageous with a view to cleaning and maintenance activities.

The housing could have a non-symmetrical cross-sectional shape, wherein the larger section comprises the magnet. In this way, savings of material and thus weight can be made, because volume is only required where the magnet is arranged.

To ensure that the spacing between the ends that form the longitudinal slit can be varied it is advantageous if the housing comprises two housing parts that are movably connected to each other. The housing parts could, for example, be connected to each other by way of a hinge. In a manner that is advantageous from the point of view of production technology, the hinge and the housing parts could be made in a single piece. As an alternative, the magnetic pulse generator according to the invention could also be designed so as to comprise individual components that are connected to each other. The preferred one-piece variant of the pulse generator according to the invention could be implemented with the use of the injection moulding method. In this process a nylon material may be used, to which water is applied after injection moulding. The hinge region could feature thin material so that after the process of applying water a flexible and tear-resistant hinge is formed. The shape of the hinge, too, could contribute to its flexibility in that the longitudinal dimension or the dimension in the direction of the swivelling axis is less than the longitudinal dimension of the housing parts. The hinge region could be the weakest position of the housing; from the swivelling axis the hinge region could diverge in transverse direction and could form a transition to the housing parts where the material is thicker.

Within the housing, a retainer for the component could be provided, into which retainer the component extends. The retainer could comprise rubber, in particular a rubber lining which in the operating position contacts the component, and due to the connection of the ends of the housing which form longitudinal slit forms a device that prevents rotation and slippage. As a result of this, the magnetic pulse generator according to the invention cannot change its position either in axial direction or in coaxial direction. A measure that enhances the prevention of rotation and slippage consists of the rubber being arranged so as to be fixed, in the form of an insert, to the retainer and comprises an extremely non-slip material. From a design point of view it is expedient if the longitudinal axis of the housing and the longitudinal axis of the component in the operating position are essentially in alignment. This ensures that the housing parts do not exert any shearing forces or clamping forces onto the component only the inner retainer of the housing with the rubber inserts is seated on the component.

As an alternative design of the magnetic pulse generator according to the invention, a housing might be considered that comprises two housing parts in the manner of a tubular piece that is divided into two in longitudinal direction. Here again a host of different connection techniques might be used to implement attachment to the component. For example, a plug-type connection might be considered. It is essential to ensure that great strength of the connection is provided, wherein as a result of the rubber inserts the radially inward directed force is influenced in a manner so as to be gentle on the component.

In a particularly advantageous manner the magnetic pulse generator according to the invention could have a low design height. In particular, the housing cross section that comprises the magnet could have an approximate height dimension in a region of approximately 6 to 9 mm, preferably approximately 7 mm. All the components of the pulse generator according to the invention could have only a few mm of design height. All the components mean the housing part that contains the magnet, as well as the rubber insert of said housing part, the rubber insert of the housing component that contains the clip for the snap-in connection and the wall of said housing component. According to an exemplary embodiment, the share of the magnet could be approximately 3 mm, the share of the first housing wall approximately 1 mm, the share of the first rubber insert approximately 0.5 mm, the share of a spoke approximately 2 mm, the share of the second rubber insert approximately 0.5 mm, and the share of the second housing wall approximately 1 mm.

The tensile force generated by the magnet of the pulse generator according to the invention could be approximately 3.8 kg. This relatively high strength of the magnet facilitates installation because the spacing between the magnet and the sensor can be up to 10 mm. If one takes into account the application area of determining the distance and the speed in the case of bicycles, then installation of the pulse generator and the sensor is made considerably easier in the case of mountain bikes with sprung forks. As a result of the above it is no longer necessary to find the precisely fitting position for the sensor on the fork so as to be able to implement the smallest possible distance between the pulse generator and the sensor.

Figure 2:
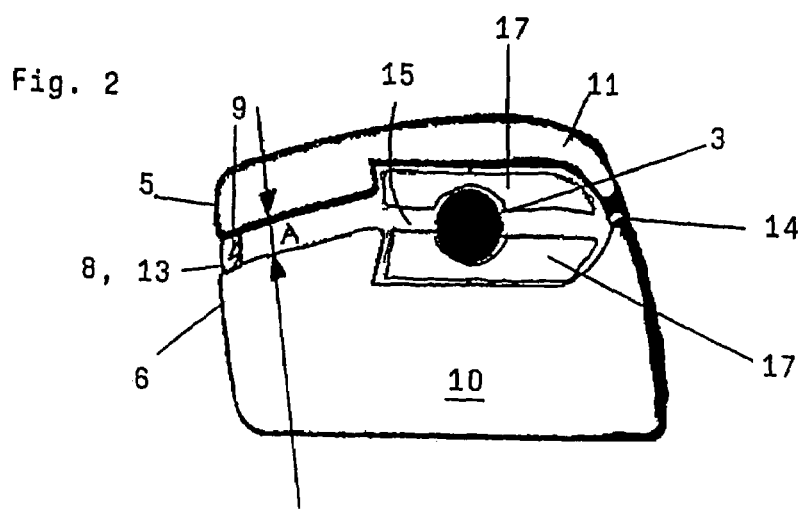
Figure 3:
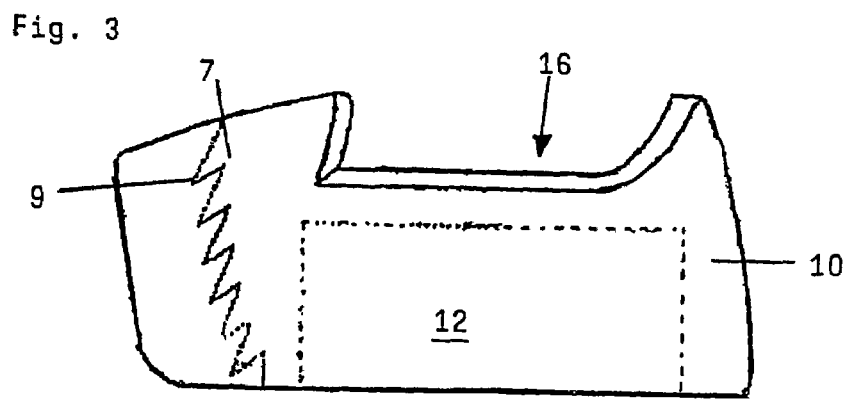
Figure 4:
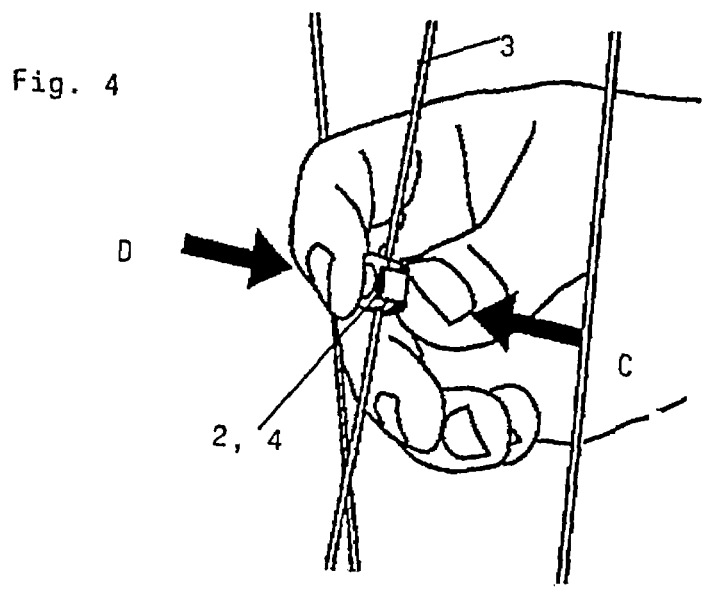
Figure 5:
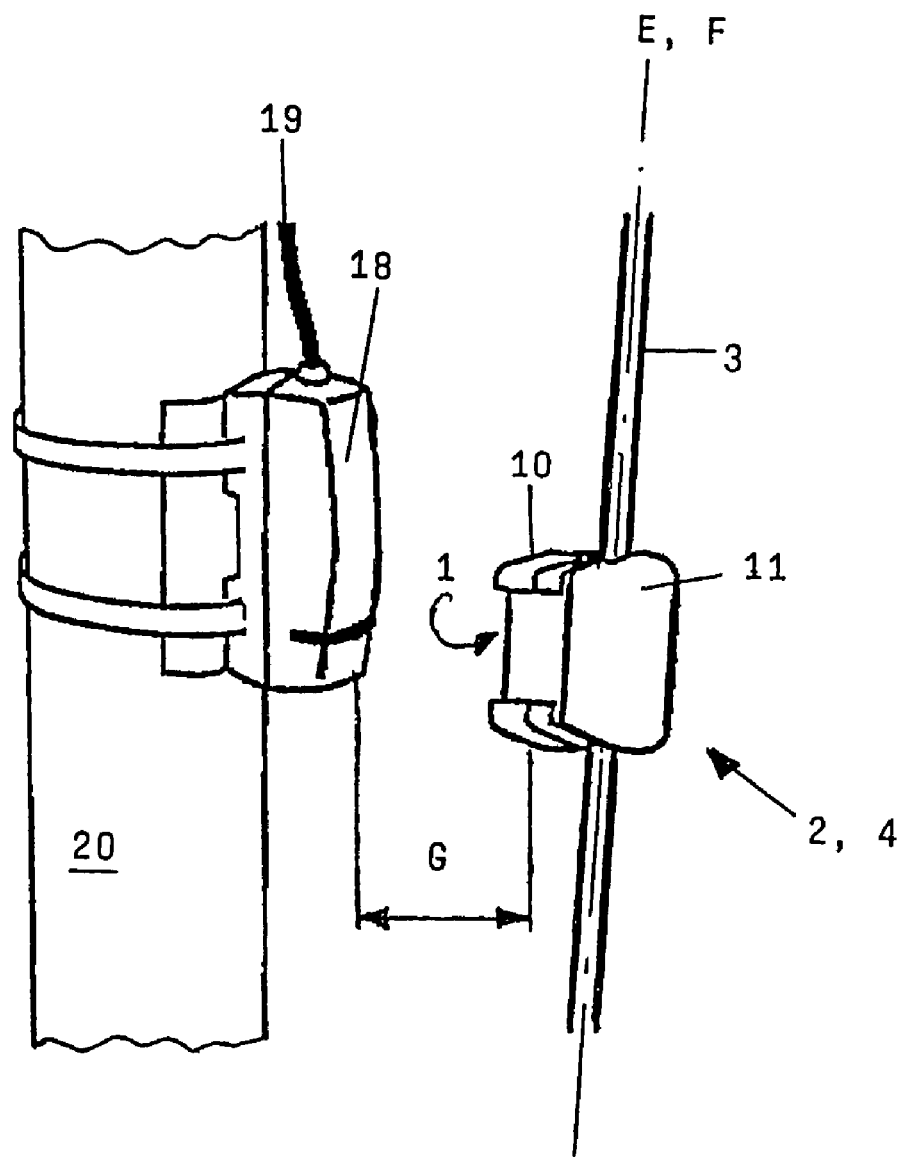

There are various options of implementing and improving the teachings of the present invention in an advantageous manner. To this effect, reference is made not only to the claims that are subordinate to claim 1, but also to the following explanation of an exemplary embodiment of the invention with reference to the drawing. In conjunction with the explanation of the stated exemplary embodiment of the invention, generally preferred embodiments and improvements of the invention are also explained. The following are shown in the drawings:

FIG. 1 a diagrammatic perspective view of the magnetic pulse generator according to the invention;

FIG. 2 a reduced lateral view of the object from FIG. 1;

FIG. 3 a perspective view, enlarged when compared to that of FIG. 2, which shows the housing part of the object shown in FIG. 1, which housing part comprises the magnet;

FIG. 4 in a reduced diagrammatic view the object of FIG. 1 during installation on the component; and FIG. 5 in an enlarged view when compared to that of FIG. 4, the object from FIG. 1 in operational position in relation to the sensor.

FIG. 1 shows a magnetic pulse generator for measuring wheel revolutions in the case of bicycles, comprising a magnet 1 and an attachment device 2 to affix the magnet 1 to a spoke 3 of a wheel.

According to the invention the attachment device 2 comprises a housing 4 that encompasses the component 3. The housing 4 is designed in the manner of a longitudinally slit tubular piece, wherein the ends 5, 6 that form the longitudinal slit can be connected to each other in a positive-locking or non-positive manner, with their spacing A from each other being variable. The term "longitudinal slit" is to be interpreted in a wide sense. Basically it is an opening, in longitudinal direction, of the housing 4, which housing 4 in transverse direction comprises a through-opening for the spoke 3, which opening makes it possible for the spoke 3 to be encompassed.

Connection means 7, 8, which form a snap-in connection, are provided at the ends 5, 6 of the housing 4, which ends 5, 6 form the longitudinal slit. The connection means 7, 8 comprise several snap-in teeth 9 so that the force required for attachment can be set depending on the geometry of the spoke 3. The snap-in connection can be designed depending on the diameter of the round spoke 3 shown in FIG. 2. According to FIGS. 2 and 3 the snap-in teeth 9 are pointed. The greater the pressure applied, the more intensive the tooth-locking action that is associated with a barb-type effect. The shape of the snap-in teeth 9 makes it impossible for the connection means 7, 8 to become undone independently. The connection of the two ends 5, 6 of the housing 4, which ends 5, 6 form the longitudinal slit, can only be undone with the use of a tool. In FIG. 3 the snap-in teeth 9 are indicated by an interrupted line.

In particular FIGS. 2 and 3 show that the cross section of the housing 4 is non-symmetrical in shape. The housing 4 comprises two housing parts 10, 11 that are connected to each other. The larger housing part 10 comprises a retainer 12, indicated by an interrupted line, for the magnet 1. For the purpose of providing the connection means 8, the smaller housing part 11 comprises a clip 13, which on its inside comprises the snap-in teeth 9 that in the operating position engage the snap-in teeth 9 of the connection means 7 of the housing component 10. FIG. 2 shows the operating position of the pulse generator according to the invention, wherein, as a result of the shape provided, a closed shape is achieved which matches the anatomy of the fingers of a hand. FIG. 4 shows how the pulse generator is attached to the spoke 3, wherein forces working in opposite direction—indicated by the arrows C and D—act. In order to effect the snap-in connection, pressure is predominantly applied in the direction C, while a counterforce is applied in the direction D. This application of pressure in the direction C is supported by the tapering shape of the housing part 11.

In the context of FIGS. 1 and 2 it becomes clear that the spacing A between the housing parts 10 and 11 can be varied in that said housing parts 10 and 11 are movably connected to each other by way of a hinge 14, and are rotatable on the swivelling axis B. The housing parts 10, 11 and the hinge 14 are made in one piece—comparable to the design of a clam. The housing 4 with its housing parts 10, 11 and the connection means 7, 8 is an injection moulded plastic part. The hinge 14, which is flexible and tear-resistant, diverges across the swivelling axis B to the housing parts 10, 11 that are made of stronger material.

The two housing parts 10, 11, or the housing 4 designed in the manner of a tubular piece, form a retainer 15 for the component or the spoke 3, which retainer 15 basically corresponds to the through-opening of a tubular piece, except that it comprises a particular geometric shape and a special fitting. To this effect each housing part 10, 11 comprises a recess 16 in which a rubber piece in the form of a rubber insert 17 is firmly affixed. As shown in FIG. 2, in the operating position the two rubber inserts 17 contact the spoke 3, thus, due to the extremely non-slip characteristics, providing a device that prevents rotation and slippage.

FIGS. 1 and 5 show that the longitudinal axis E of the retainer 15 of the housing 4 is aligned with the longitudinal axis F of the spoke 3 in the operating position.

In the present exemplary embodiment the design height of the housing 4 is approximately 7 mm. As far as the width and height dimensions of the present exemplary embodiment are concerned, reference is made to FIG. 4, which shows that the component is smaller than a fingertip. The tensile force generated by the magnet is approximately 3.8 kg. This makes it possible for the space G between the magnet 1 and a sensor 18 that receives the pulses in a non-contacting manner to be fairly large; in the exemplary embodiment shown approximately 10 mm. The sensor 18 is designed in the form of a reed switch.

FIG. 19 designates an electrical connection to the bicycle computer (not shown). The sensor 18 is attached to the fork 20 of a bicycle.

As far as further characteristics that are not shown in the figures are concerned, reference is made to the general part of the description.

In conclusion it should be pointed out that the theory according to the invention is not limited to the exemplary embodiment set out above. Instead, for example, a host of different designs of the housing parts, connection means and rubber inserts are possible.

LIST OF REFERENCE CHARACTERS

1 Magnet
2 Attachment device
3 Spoke
4 Housing
5 End of 4 (in longitudinal direction)
6 End of 4 (in longitudinal direction)
7 Connection means of 10
8 Connection means of 11
9 Snap-in teeth
10 Housing part
11 Housing part
12 Retainer in 10 for 1
13 Clip on 11
14 Hinge
15 Retainer for 3 in 4
16 Recess in 10, 11
17 Rubber insert
18 Sensor
19 Electrical connection
20 Bicycle fork
A Spacing
B Swivelling axis
C Direction of force
D Direction of force
E Longitudinal axis of 15
F Longitudinal axis of 3
G Distance between 1 and 18

The invention claimed is:

1. A magnetic pulse generator for measuring wheel revolutions of bicycles, comprising;
a magnet and an attachment device for attaching the magnet to a movable component of a wheel,
wherein the attachment device comprises a housing that encompasses the component,
wherein the housing is formed as a longitudinally slit tubular piece, wherein first and second ends that form a longitudinal slit that are connectable and disconnectable relative to each other in a positive-locking and/or non-positive manner,
wherein the housing comprises two housing parts that are movably connected to each other, and
wherein a spacing (A) between the two housing parts is variable.

2. Them magnetic pulse generator according to claim 1, wherein connection means are provided for connecting the first and second ends that form the longitudinal slit, the connection means providing a snap-in connection.

3. The magnetic pulse generator according to claim 2, wherein the connection means comprise several snap-in teeth, and a force effect required for attachment is set depending on a geometry of the component.

4. The magnetic pulse generator according to any one of claims 2 or 3, wherein connection of the first and second ends of the housing are adapted to be disconnected by use of a tool.

5. The magnetic pulse generator according to claim 1, wherein a lateral cross section of the housing is non-symmetrical in shape, and one of the two housing parts is larger than the other of the two housing parts, wherein the larger housing part comprises magnet.

6. The magnetic pulse generator according to claim 1, wherein the housing comprises a retainer for fitting around the component wherein the component is a spoke.

7. The magnetic pulse generator according to claim 6, wherein in order to prevent rotation and slippage, the retainer comprises rubber, which in an operating position contacts the component.

8. The magnetic pulse generator according to claim 7, wherein the rubber is a rubber insert arranged so as to be fixed in a recess in each of the two housing parts.

9. The magnetic pulse generator according to claim 6, wherein a longitudinal axis (E) of the housing or of the retainer of the housing and a longitudinal axis (F) of the component in an operating position are substantially coaxial relative to each other.

10. The magnetic pulse generator according to claim 1, wherein the two housing parts form a tubular piece that is divided into two in a longitudinal direction.

11. The magnetic pulse generator according to claim 1, wherein a height of the housing is approximately 7 mm.

12. The magnetic pulse generator according to claim 1, wherein a tensile force generated by the magnet is approximately 3.8 kg, and a space (G) between the magnet and a sensor that receives pulses in a non-contacting manner is up to approximately 10 mm.

13. A magnetic pulse generator for measuring wheel revolutions of bicycles, comprising;
    a magnet and an attachment device for attaching the magnet to a spoke of a wheel,
    wherein the attachment device comprises a housing that encompasses the spoke, and
    wherein the housing includes first and second housing parts which form a longitudinally slit tubular piece, wherein ends of the first and second housing parts form a longitudinal slit and are connectable and disconnectable relative to each other in a positive-locking and/or non-positive manner, and a spacing (A) between the first and second housing parts is variable, and
further comprising
    a recess formed in the first housing part facing a recess formed in the second housing part,
    a rubber insert being provided in each of the two facing recesses in order to prevent rotation and slippage of the attachment device relative to the spoke,
    the two rubber inserts being visible when the attachment device is viewed in a plan view and bottom view.

14. The magnetic pulse generator according to claim 13, wherein a larger one of the first and second housing parts comprises the magnet.

15. The magnetic pulse generator according to claim 14, wherein the first and second housing parts are pivotably connected to each other by way of at least one hinge.

16. The magnetic pulse generator according to claim 15, wherein the two housing parts and the hinge are formed in one piece.

17. The magnetic pulse generator according to claim 16, wherein the two housing parts and the hinge are made from plastic.

18. The magnetic pulse generator according to claim 15, wherein a longitudinal dimension of the hinge is shorter than that of the two housing parts.

\* \* \* \* \*